United States Patent [19]
Pozerycki

[11] Patent Number: 5,503,447
[45] Date of Patent: Apr. 2, 1996

[54] GRIPPER ADJUSTABLE FOR GRIPPING PARTS OF DIFFERENT SIZES

[75] Inventor: J. David Pozerycki, Jaffrey, N.H.

[73] Assignee: W. W. Cross, Inc., Jaffrey, N.H.

[21] Appl. No.: 178,730

[22] Filed: Jan. 10, 1994

[51] Int. Cl.⁶ .................................................. B25J 15/08
[52] U.S. Cl. .............................. 294/115; 294/88; 901/36
[58] Field of Search ........................... 294/86.4, 88, 90, 294/95, 97, 104, 106, 115, 119.1, 902; 269/24, 27, 32, 34, 71, 146, 164, 165, 172, 177, 242; 901/36–39

[56] References Cited

U.S. PATENT DOCUMENTS

| | | | |
|---|---|---|---|
| 1,693,074 | 11/1928 | Falco | 294/106 X |
| 1,733,084 | 10/1929 | Schmidt et al. | 294/115 |
| 2,226,789 | 12/1940 | Tupy | 294/106 |
| 2,233,212 | 2/1941 | Jensen | 294/115 X |
| 2,370,528 | 2/1945 | Fontaine | 294/88 |
| 2,561,536 | 7/1951 | Rowe | 294/88 X |
| 3,386,297 | 6/1968 | Willis | 294/88 X |
| 4,676,542 | 6/1987 | Besold | 294/115 X |
| 4,697,839 | 10/1987 | Fischer | 294/115 |

FOREIGN PATENT DOCUMENTS

| | | | |
|---|---|---|---|
| 1418262 | 8/1988 | U.S.S.R. | 294/115 |

*Primary Examiner*—Johnny D. Cherry
*Attorney, Agent, or Firm*—George W. Dishong

[57] ABSTRACT

A gripper mechanism having at least one pair of opposing and co-acting gripper fingers that can be actuated to move from a non-gripping to a gripping position and vice versa upon application of a control signal to the gripper and the subsequent motion of the gripper actuator being applied to move the gripper fingers. The gripper provides an assembly to adjust the spacing between each of the pairs of opposing and co-acting gripper fingers, thus providing an adjustability feature to the gripper permitting thereby the ability of the gripper to grip parts of different sizes and of irregular geometries. One or more grippers as previously described may be incorporated with a material-handling apparatus having controls, power sources, platforms and other features appropriate to handle, orient, operate on, move and otherwise process parts in any fashion, where the gripper provides the apparatus with the adjustability to grip, hold, handle, orient and move parts of different sizes.

8 Claims, 4 Drawing Sheets

GRIPPER ADJUSTABLE FOR GRIPPING PARTS OF DIFFERENT SIZES

BACKGROUND OF THE INVENTION

1. Field of the Invention

This invention most generally relates to use of grippers on high speed and high volume production equipment to hold and handle parts during manufacture and assembly. Grippers are generally mechanical devices, each with two or more fingers actuated by air (pneumatic), electric (solenoid), or oil (hydraulic) to open or close on the subject part.

Individual grippers used on high speed production equipment are generally designed to have a specific stroke length and motion, with a fixed open and closed dimension. They are often of two dominant types: those having fingers which remain "parallel" as they are moved to open or close, and those having fingers that rotate open and closed about a "fulcrum" at the base of the gripper.

Production equipment is often configured to accept interchangeable gripper chucks, each with different size grippers to accommodate required changes in production. The production changes usually necessitate the removal and replacement of individual gripper chucks to accommodate the change in the sizes of the material being handled in the production equipment, and also necessitate the owning of and maintenance of an inventory of gripper chucks with varying sizes of grippers to satisfy the range of production requirements.

2. Description of the Prior Art

Prior art in the related fields of this invention discloses the "fulcrum" and "parallel" types of grippers in a wide range of gripper sizes and chuck configurations, the use of turret mechanisms to mount more grippers on a given machine, means of mounting gripper chucks on robot arms, techniques for improving the sensitivity and effectiveness of the grip, and the utility of standard size, interchangeable chucks to provide a common mounting scheme for different size grippers. The art discloses that incremental improvements have been valuable to the industry.

It is obvious that there are overhead costs and other problems associated with the necessity of owning and maintaining a large inventory of gripper chucks and having them readily available to the production floor. There are also inherent problems associated with the need to interchange chucks on production equipment as pilot or production requirements change, examples of which are reduced levels of productivity and increased production costs. These problems remain largely unsolved.

There are patents which disclose ways of obtaining versatility using a multiple gripper turret as in Spacher et al, U.S. Pat. No. 4,930,976, exchangeable gripping jaws as in Weisner et al, U.S. Pat. No. 4,715,636, a dual axis gripper as in Barrows, U.S. Pat. No. 4,626,013, a complicated scheme for use in an automated foundry plant as in Jacobsen, U.S. Pat. No. 4,840,416 and a gripper having a plurality of pseudo spherical contact pads permitting a plurality of points of contact with an object to be gripped as in Guinot et al, U.S. Pat. No. 4,653,793. Wright, U.S. Pat. No. 4,610,597 teaches a mechanical interface for joining a gripper to a robot wrist.

The following U.S. patents are representative of the state of the art in the field of this invention.

Wiesner et al U.S. Pat. No. 4,715,636, discloses the utility of exchangeable gripper jaws for customizing grippers for the user's specific needs; a useful technique but it leads one to greater inventory problems, not less.

Spacher et al U.S. Pat. No. 4,930,976, teaches the use of a multigripper turret to enhance the capability of a parts-handling station; a useful technique but not a cost-effective solution for simpler operations nor a reduction to gripper inventory requirements.

It is important to note that none of the prior art known to the inventor hereof discloses or suggests the invention disclosed herein.

SUMMARY OF THE INVENTION

The invention in its simplest form is an improvement to a gripper having at least one pair of opposing and co-acting gripper fingers that can be actuated to move from a non-gripping to a gripping position and vice versa upon application of a control signal to the gripper and the subsequent motion of the gripper actuator being applied to move the gripper fingers. The improvement provides a means to adjust the spacing between each of the pairs of opposing and co-acting gripper fingers, thus providing an adjustability feature to the gripper permitting thereby the ability of the improved gripper to grip parts of different sizes and of irregular geometries.

The improvement further provides means for adjustment to the position of the end points of the stroke of the gripper fingers, providing further adjustability to the gripper to grip parts of different sizes.

The improvement also further provides for adjustment of the motion of the fingers, relative to the motion of the actuator. Linear, non-linear, parallel, circular, and rotational effects are among the adjustments to finger motion relative to actuator motion that can be accomplished by this invention. This allows the user, for example, to adjust the gripper finger stroke for a slower, shorter motion with greater force near the end of the gripping stroke at the point of firm contact with the subject part, and a greater length of motion at the other end of the stroke to provide greater clearance as the subject part is released and removed from the gripper, thus providing further adjustability to the improved gripper to grip parts of different sizes.

The means for adjusting spacing between opposing and co-acting fingers may consist of opposing fingers attached to respective pivot nuts which are adjustably interconnected by a gripper finger lead screw in such a way that adjustment of the lead screw opens or closes the spacing between the pivot nuts and the spacing between their respective fingers, thus providing adjustability to grip parts of different sizes.

The means for adjusting the position of the end points of a gripper finger's stroke and adjusting the motion of the finger relative to the motion of the actuator may consist of a gripper finger link assembly that is adjustable in its effective length and configuration. The assembly may be attached to the finger and to one or more reference points so that the end point positions of the finger stroke and the motion of the finger relative to the motion of the actuator are controlled by the effective length and configuration of the assembly. Adjustments to the assembly may introduce linear, non-linear, parallel, circular, rotational and other components to the resultant motion of the gripper finger relative to the motion of the actuator.

One or more improved grippers as previously described may be incorporated with a material-handling apparatus having controls, power sources, platforms and other features appropriate to handle, orient, operate on, move and otherwise process parts in any fashion, where the improved gripper provides the material-handling apparatus with the adjustability to grip, hold, handle, orient and move parts of different sizes.

These and further objects of the present invention will become apparent to those skilled in the art after a study of the present disclosure of the invention and with reference to the accompanying drawings which are a part hereof, wherein like numerals refer to like parts throughout, and in which:

DESCRIPTION OF THE PREFERRED EMBODIMENT

The invention admits of many possible variations in the details of the adjustable assembly comprising the improvement. It is also obvious to those of ordinary skill in this art that it is obvious and clear that the methods for providing for the adjustment of the finger spacing may be other than mechanical means. For example, it is well within the scope of this invention to provide for the adjustment of the grip dimensions by using numerically controlled or digitally controlled stepper motors which would rotate the lead screw and consequently change the finger grip spacing. It is also understood by those of ordinary skill in the field to which this invention relates and to similar fields, that a plurality of opposed and coaching finger pairs, each of the pairs being controllable as to the spacing between the opposed fingers, could all be actuated to grip an irregularly shaped object at a number of locations on the object. The improved gripper mechanism may be mountable onto a robotic arm and the arm could be used to handle, process, move and otherwise manipulate objects in sequence where the size and geometry of the sequentially handled objects may vary considerably. The grip spacing of the improved gripper mechanism could be programmably controlled to provide for the handling of the various shaped objects.

The following is a description of merely the preferred embodiment of the invention.

In this embodiment, a lead screw is used to provide adjustment of the spacing of pivot nuts to which gripper fingers are attached. Gripper finger links adjustable in effective length and positionally adjustable within their respective gripper actuator plate slots provide an adjustable, rotational component to the actuator-finger linkage, thereby providing means for adjustment of the end point positions of the stroke of the fingers and providing means for adjustment to the finger motion, relative to the actuator motion. The adjusted gripper finger links control the endpoint position of the finger stroke, transfer actuator force to the fingers at the adjusted finger spacing, and cause a non-linear response to the finger motion, relative to the actuator motion.

The ability to make adjustments to the spacing, endpoint position and motion of the fingers of this improved gripper in order to grip parts of different sizes, rather than keeping at hand and interchanging separate gripper chucks or interchangeably gripper jaws, is a fundamental advantage of this invention.

Figure 1:
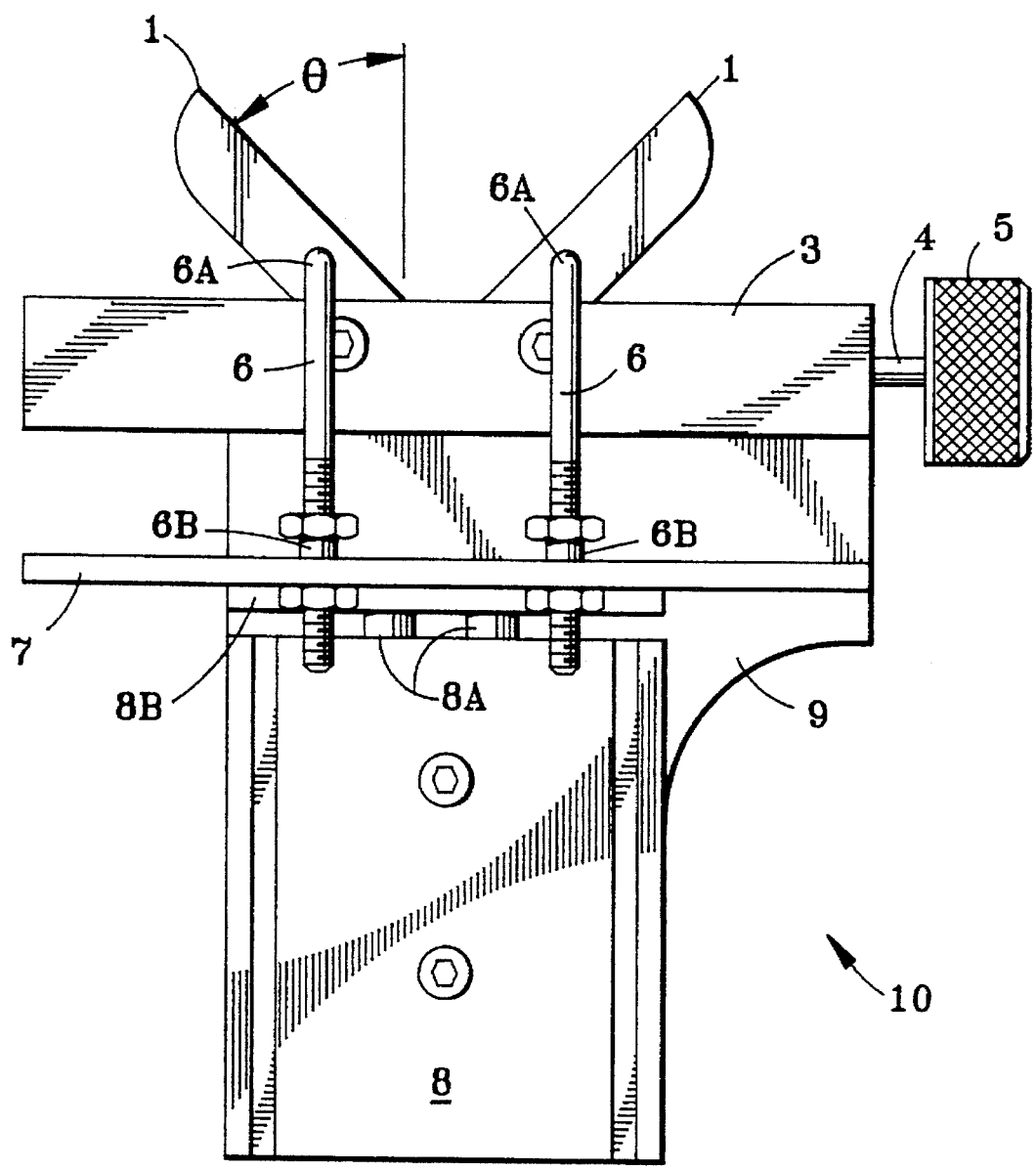
FIG. 1 is a front view of an improved gripper with fulcrum-type action and fingers in the open or non-gripping position, adjusted for a shorter distance between fingers as compared to FIG. 2.
Figure 2:
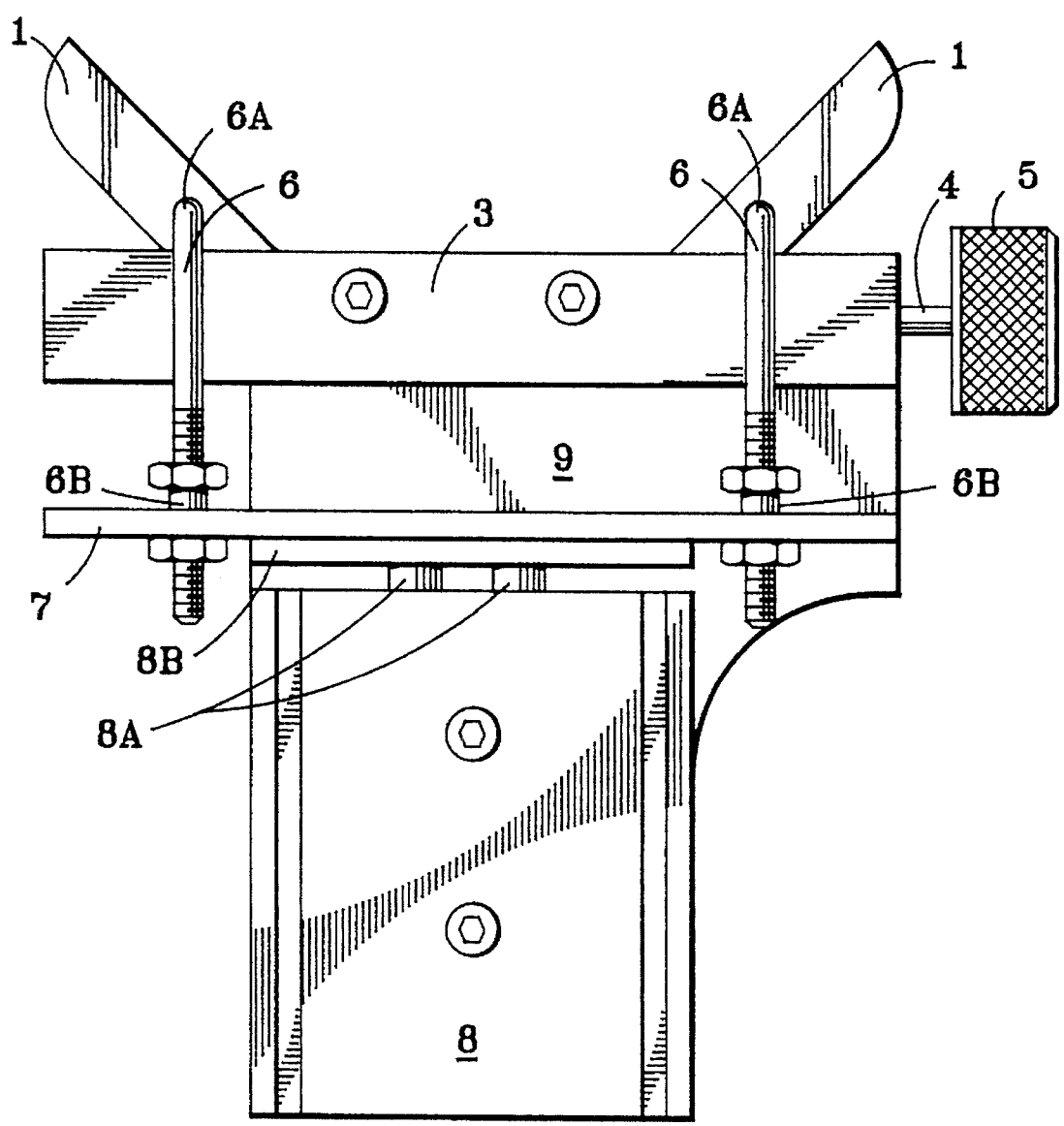
FIG. 2 is a front view of the improved gripper with fulcrum-type action and fingers in the open or non-gripping position, adjusted for a longer distance between fingers, as compared to FIG. 1.
Figure 3:
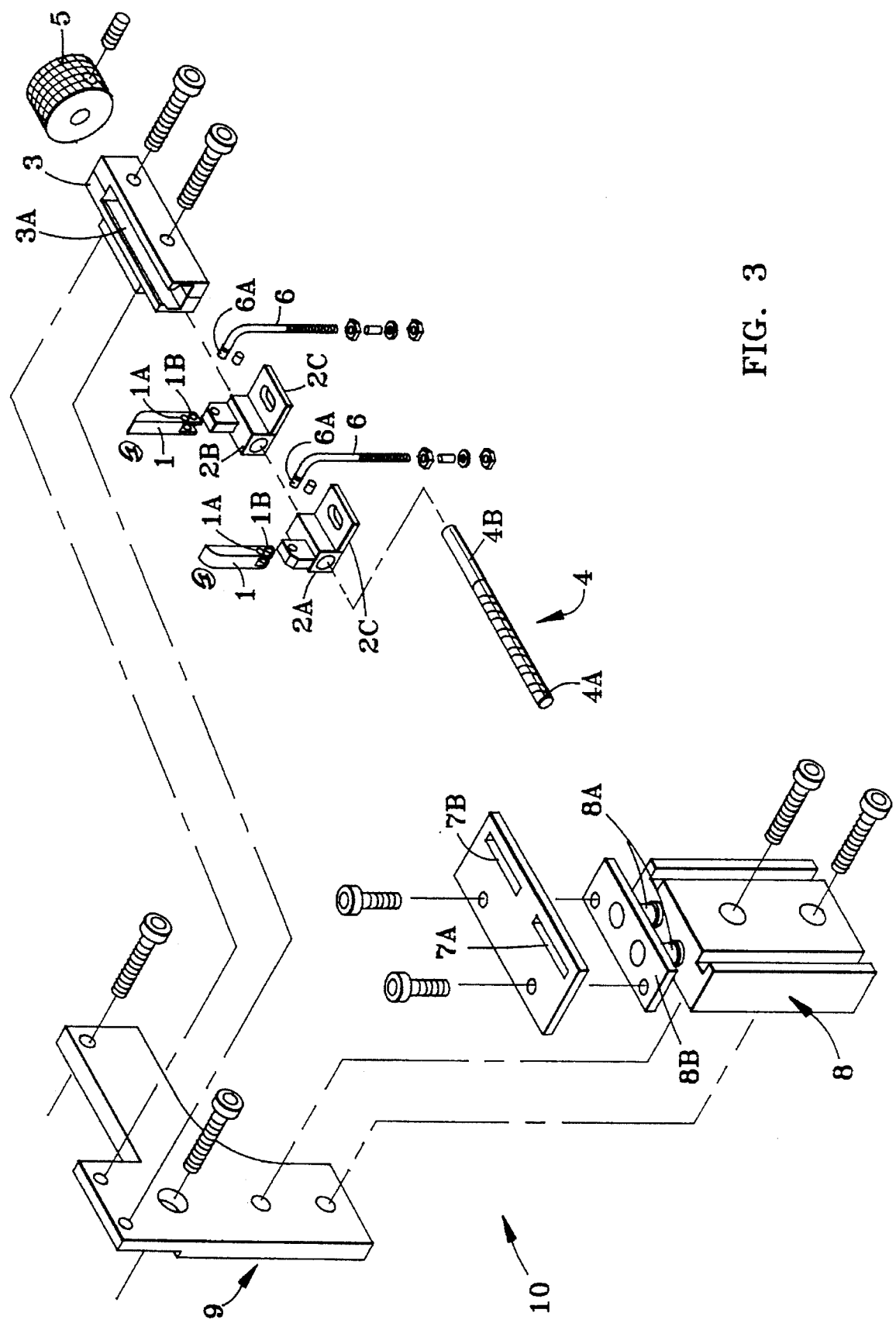
FIG. 3 is an exploded perspective view illustrating the components of the improved gripper mechanism illustrating the components which provide for the adjustability of the finger grip spacing comprising the improvement.
Figure 4:
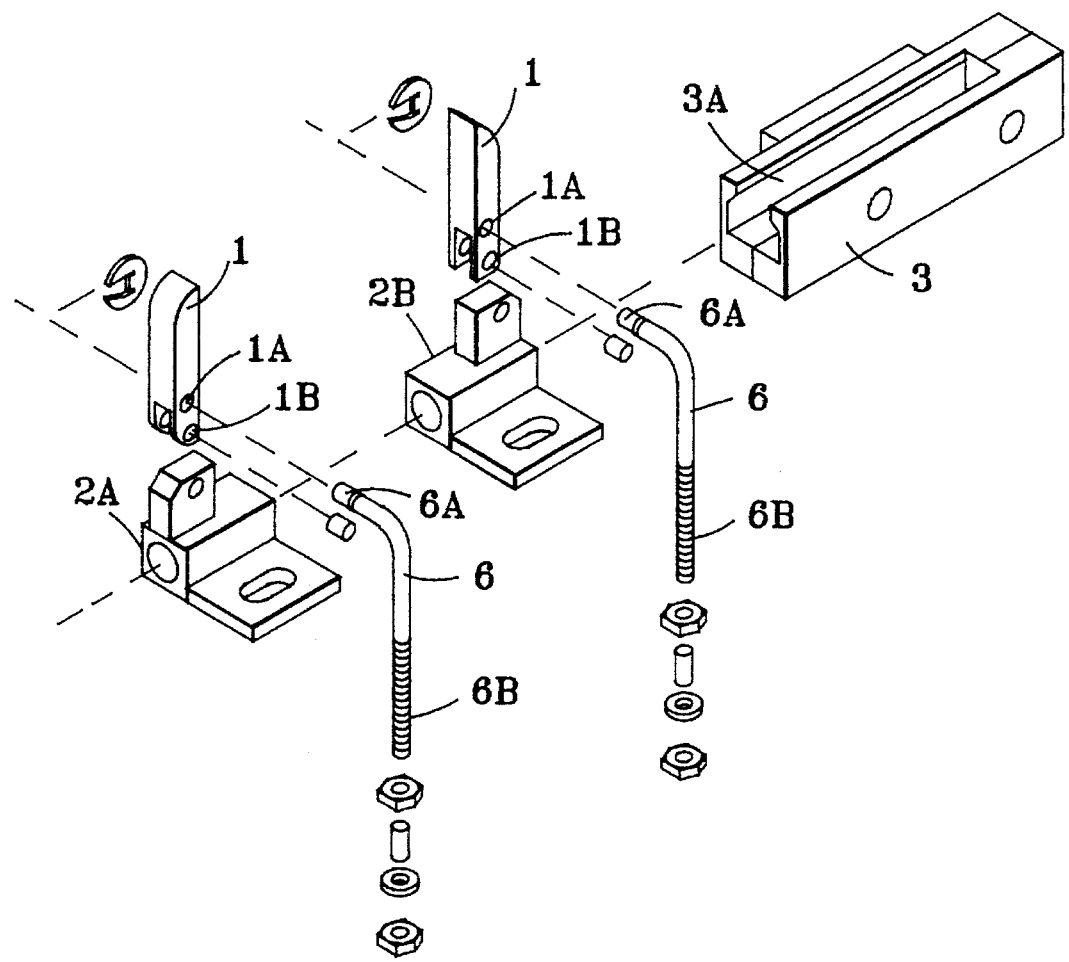
FIG. 4 is an exploded perspective view of the improved gripper mechanism illustrating the detail of the pivot nuts, finger links and Lead screw components which provide for the adjustability of the finger grip spacing.

Reference is now made to FIGS. 1–4, which illustrate pictorially, the various elements of the preferred embodiment of the improved gripper mechanism 10 of the present invention.

Opposing and co-acting fingers 1, are each pivotably attached to respective right-hand threaded and left-hand threaded pivot nuts 2A and 2B, which are held securely and slideably within track 3A of gripper finger carrier 3. Finger gripper lead screw 4, configured on one end with counter-rotating threads 4A and 4B, threadingly connects, in a predetermined but adjustable spaced relationship, the right-hand threaded and left-hand threaded pivot nuts 2A and 2B. Another end of lead screw 4 extends through one end of gripper finger carrier 3 and is terminated by lead screw knob 5. Gripper finger carrier 3 is secured to gripper assembly bracket 9. It is obvious that the geometry of bracket 9 will depend upon the system or apparatus in which improved gripper 10 will be used. The design of bracket 9 is strictly a function of the use for and the geometry and size of gripper 10.

Gripper actuator plate 7 is secured to outboard end 8B of actuator piston 8A. Actuator cylinder 8 is secured to gripper assembly bracket 9, but properly spaced from gripper finger carrier 3 to allow for the stroke length of actuator piston 8A.

Gripper finger links 6, attached at one end 6A to opposing fingers 1 in finger link holes 1A, are each adjustable in effective length and adjustably positionable within their respective slots 7A and 7B in gripper actuator plate 7. The adjustability of the effective lengths of each of links 6 provides variability in the motion of each of fingers. The location of finger link holes 1A relative to pivot holes 1B provides for a predetermined path of movement of fingers 1 when actuator cylinder 8 causes a movement of piston 8A and outboard end 8B. Actuator plate 7, carried by the stroke of actuator piston 8A, transmits force via gripper finger links 6 to opposing fingers 1, providing the resultant gripper motion and force. Actuator plate ends 6B of each of finger links 6 are slidingly attached to actuator plate slots 7A and 7B using well known items such as nuts, washers, spacers and the like. Link stabilizer tabs 2C may be attached to pivot nuts 2A and 2B with each tab 2C having an aperture therethrough sized to permit the sliding passage of finger link 6.

Rotational adjustment of lead screw knob 5 changes the distance between pivot nuts 2A and 2B, thereby affecting the distance between opposing fingers 1. Adjustments to the effective length of gripper finger links 6, and to their position within the slots of gripper actuator plate 7, affect the endpoint positions of the stroke and the motion of opposing fingers 1, relative to the motion of actuator piston 8A. These adjustments separately and in combination provide improved gripper 10 with the adjustability to grip parts of different sizes.

It is understood that the improved gripper mechanism 10 as illustrated and described herein may have different dimensions and variations of the illustrated basic geometry and may have different attitudes within the apparatus wherein the instant invention is being used.

It is also thought that the improved gripper mechanism 10 and its use in various types of material handling apparatii and many of its attendant advantages will be understood from the foregoing description and it will be apparent that various changes may be made in the form, construction and arrangement of the parts thereof without departing from the spirits and scope of the invention or sacrificing all of its material advantages, the form hereinbefore described being merely a preferred or exemplary embodiment thereof.

Variations on the means of adjustability illustrated in this embodiment, to include application to other types of grippers such as parallel-type grippers, will be readily apparent from the teaching and principles disclosed herein to those skilled in the art, and are covered by the claims which follow:

I claim:

1. A gripper mechanism which is adjustable for gripping parts of different sizes, wherein said gripper comprises:

at least one pair of opposing and co-acting gripper fingers, means for actuating said pair of gripper fingers from a non-gripping to a gripping position and from said gripping position to said non-gripping position, and means for adjusting of a grip spacing dimension between said opposing and co-acting gripper fingers wherein said means for adjusting of a grip spacing dimension comprises at least one pair of pivot nuts wherein one of said pair is a right hand threaded pivot nut and another of said pair is a left-hand threaded pivot nut, each said pivot nut pivotally attached to one finger of said pair of gripper fingers, a gripper finger lead screw interconnecting said pivot nuts spaced apart such that adjustment of said lead screw affects said grip spacing dimension.

2. The gripper mechanism according to claim 1, said means for adjusting of a grip spacing dimension further includes at least one gripper finger link assembly for adjusting the location of end point positions and the motion of said fingers relative to said means for actuating, said assembly comprising: a pair of gripper finger links having one end pivotally attached to one of said fingers and another end in slideable attachment to said means for actuating and said another end adjustably positionable relative to said means for actuating in a manner such that adjustments to said gripper finger link assembly affect said end point positions of the stroke of said finger and said motion of said finger relative to the motion of said means for actuating.

3. The gripper mechanism according to claim 1 wherein said gripper mechanism further comprises means for controlling a gripper finger pivot angle said pivot angle being measured from said gripping position to said non-gripping position.

4. The gripper mechanism according to claim 3 wherein said means for adjusting a grip spacing dimension comprises at least one pair of pivot nuts to which said gripper fingers are pivotally attached, said pivot nuts configured to be slideable within a gripper finger links track component; at least one gripper finger lead screw, said at least one gripper finger lead screw having a right-hand threaded portion and a left-hand threaded portion adjacent said right-hand threaded portion and a control end, each said right-hand threaded portion and left-hand threaded portion configured to cooperate with said pivot nuts and provide for interconnection and definition of a grip space dimension between said gripper fingers.

5. The gripper mechanism according to claim 4 wherein said means for controlling a gripper finger pivot angle comprises: each said fingers having a motion relative to said motion of said means for actuating, said finger having end point positions and a stroke, a pair of gripper finger links having one end pivotally attached to one of said fingers and another end in slideable attachment to said means for actuating and said another end adjustably positionable relative to said means for actuating in a manner such that adjustments to said gripper mechanism affect said end point positions of said stroke of said finger and said motion of said finger relative to the motion of said means for actuating.

6. The gripper mechanism according to claim 3 wherein said means for controlling a gripper finger pivot angle comprises: each said finger having a motion relative to said motion of said means for actuating, said finger having end point positions and a stroke, a pair of gripper finger links having one end pivotally attached to one of said fingers and another end in slideable attachment to said means for actuating and said another end adjustably positionable relative to said means for actuating in a manner such that adjustments to said gripper mechanism affect said end point positions of said stroke of said finger and the motion of said finger relative to the motion of said means for actuating.

7. A gripper mechanism which is adjustable for gripping parts of different sizes, wherein said gripper comprises: at least one pair of opposing and co-acting gripper fingers, means for actuating said pair of gripper fingers from a non-gripping to a gripping position and from said gripping position to said non-gripping position, and means for adjusting of a grip spacing dimension between at least one pair of said opposing co-acting gripper fingers, said means for adjusting of a grip spacing dimension includes at least one gripper finger link assembly for adjusting the location of end point positions and the motion of said fingers relative to said means for actuating, said assembly comprising: a pair of gripper finger links having one end pivotally attached to one of said fingers and another end in slideable attachment to said means for actuating and said another end adjustably positionable relative to said means for actuating in a manner such that adjustments to said gripper finger link assembly affect said end point positions of the stroke of said finger and said motion of said finger relative to the motion of said means for actuating.

8. The gripper mechanism according to claim 7 wherein said means for adjusting of a grip spacing dimension further comprises at least one pair of pivot nuts wherein one of said pair is a right-hand threaded pivot nut and another of said pair is a left-hand threaded pivot nut, each said pivot nut pivotally attached to one finger of said pair of gripper fingers, a gripper finger lead screw interconnecting said pivot nuts spaced apart such that adjustment of said lead screw affects said grip spacing dimension.

* * * * *